US008851433B2

(12) United States Patent
Yonemaru

(10) Patent No.: US 8,851,433 B2
(45) Date of Patent: Oct. 7, 2014

(54) BRACKET ACCOMMODATION STRUCTURE

(75) Inventor: Shinichirou Yonemaru, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/982,041

(22) PCT Filed: Sep. 2, 2011

(86) PCT No.: PCT/JP2011/070537
§ 371 (c)(1),
(2), (4) Date: Jul. 26, 2013

(87) PCT Pub. No.: WO2012/101861
PCT Pub. Date: Aug. 2, 2012

(65) Prior Publication Data
US 2013/0306819 A1    Nov. 21, 2013

(30) Foreign Application Priority Data
Jan. 26, 2011   (JP) .................... 2011-014275

(51) Int. Cl.
*F16M 1/00*   (2006.01)
*F16B 5/02*   (2006.01)
*F16M 13/02*   (2006.01)
*F16B 1/00*   (2006.01)

(52) U.S. Cl.
CPC ........... *F16M 13/022* (2013.01); *F16B 5/0225* (2013.01); *F16B 1/00* (2013.01)
USPC .................... 248/188.8; 248/188.2

(58) Field of Classification Search
CPC ...... A47B 91/00; A47B 13/021; A47B 91/02; A47B 91/024; A47B 91/16
USPC ............... 248/220.21, 224.14, 223.41, 224.8, 248/225.11, 298.1, 188, 188.1, 189.91, 686, 248/688
See application file for complete search history.

(56) References Cited

U.S. PATENT DOCUMENTS

| 5,131,617 A * | 7/1992 | McGarrah | 248/500 |
| 6,193,208 B1 * | 2/2001 | Schmitt et al. | 248/688 |
| 6,533,238 B2 * | 3/2003 | Barnes et al. | 248/680 |
| 6,866,282 B2 * | 3/2005 | Heerspink | 280/296 |

(Continued)

FOREIGN PATENT DOCUMENTS

| CN | 101271354 A | 9/2008 |
| CN | 101472434 A | 7/2009 |

(Continued)

OTHER PUBLICATIONS

Communication dated Apr. 10, 2014, issued by the State Intellectual Property Office of the People's Republic of China in corresponding Application No. 201180066113.6.

*Primary Examiner* — Steven Marsh
(74) *Attorney, Agent, or Firm* — Sughrue Mion, PLLC

(57) ABSTRACT

Provided is a bracket accommodation structure which prevents damage to a fixing screw with a simple structure. The bracket accommodation structure comprises a device (10), a bracket (20) slidably provided to the device (10), and a fixing screw (30) for fixing the bracket (20) to the device (10). The device (10) has, on a surface of a housing, a first stopper portion (11) adapted to restrict movement of the bracket (20) to a front side in a sliding direction (X1), a second stopper portion (12) adapted to restrict movement of the bracket (20) to a back side in the sliding direction (X1), and a screw hole (13) into which the fixing screw (30) is screwed. The bracket (20) has a first to-be-restricted portion (25) adapted to abut against the first stopper portion (11) so as to be restricted in movement to the front side in the sliding direction (X1), a second to-be-restricted portion (26) adapted to abut against the second stopper portion (12) so as to be restricted in movement to the back side in the sliding direction (X1), and a slit portion (24) which is formed along the sliding direction (X1) and through which a shaft portion (31) of the fixing screw (30) is inserted.

6 Claims, 8 Drawing Sheets

(56) References Cited

U.S. PATENT DOCUMENTS

| | | | |
|---|---|---|---|
| 7,775,498 B2 * | 8/2010 | Phillips et al. | 248/550 |
| 2006/0284038 A1 * | 12/2006 | Hartman et al. | 248/298.1 |

FOREIGN PATENT DOCUMENTS

| | | | |
|---|---|---|---|
| JP | 57-121176 U | | 7/1982 |
| JP | 3-68558 B2 | | 10/1991 |
| JP | 4-98897 A | | 3/1992 |
| JP | 6-51012 Y2 | | 12/1994 |
| JP | 6-350261 A | | 12/1994 |
| JP | 7-242148 A | | 9/1995 |
| JP | 2002-269966 A | | 9/2002 |
| JP | 2003-284176 A | | 10/2003 |
| WO | 2010/137148 A1 | | 12/2010 |

* cited by examiner

BRACKET ACCOMMODATION STRUCTURE

CROSS REFERENCE TO RELATED APPLICATIONS

This application is a National Stage of International Application No. PCT/JP2011/070537, filed on Sep. 2, 2011, which claims priority from Japanese Patent Application No. 2011-014275, filed on Jan. 26, 2011, the contents of all of which are incorporated herein by reference in their entirety.

TECHNICAL FIELD

This invention relates to a bracket accommodation structure.

BACKGROUND ART

Conventionally, there is known a housing stand mechanism comprising a housing, arms, and a screw, wherein an elongated hole is formed in each arm and the screw is inserted into the elongated holes so that the arms are slid ably attached to a bottom surface of the housing (see, e.g. Patent Document 1).

PRIOR ART DOCUMENT

Patent Document 1: JP-A-H6-350261 (FIGS. 11 and 12)

SUMMARY OF THE INVENTION

Problem to be Solved by the Invention

However, in the conventional housing stand mechanism, there has been a problem that when the arms are slid, the inner edges of the elongated holes and a shaft portion of the screw are brought into contact with each other so that a load is applied directly to the screw to cause damage to the screw.

Therefore, this invention aims to solve the conventional problem, that is, it is an object of this invention to provide a bracket accommodation structure which prevents damage to a fixing screw with a simple structure.

Means for Solving the Problem

A bracket accommodation structure of this invention has solved the above-mentioned problem by comprising a device, a bracket slidably provided to the device, and a fixing screw for fixing the bracket to the device, wherein the device has, on a surface of a housing, a first stopper portion adapted to restrict movement of the bracket to a front side in a sliding direction, a second stopper portion formed more on a back side in the sliding direction than the first stopper portion and adapted to restrict movement of the bracket to the back side in the sliding direction, and a screw hole into which the fixing screw is screwed, and wherein the bracket has a first to-be-restricted portion adapted to abut against the first stopper portion so as to be restricted in movement to the front side in the sliding direction, a second to-be-restricted portion formed more on the back side in the sliding direction than the first to-be-restricted portion and adapted to abut against the second stopper portion so as to be restricted in movement to the back side in the sliding direction, and a slit portion which is formed along the sliding direction and through which a shaft portion of the fixing screw is inserted.

Effect of the Invention

In this invention, since there is provided a stopper mechanism comprising a first stopper portion and a second stopper portion of a device and a first to-be-restricted portion and a second to-be-restricted portion of a bracket, contact between a shaft portion of a fixing screw and the bracket can be avoided when the bracket is slid. Therefore, it is possible to prevent a load from being applied directly to the fixing screw and thus to prevent damage to the fixing screw.

Further, since the bracket can be accommodated in a projected area of the device, it is possible to reduce a device placement space and thus to reduce particularly a device storage space when the device is stored.

Further, by loosening the fixing screw when sliding the bracket, it is possible to slide the bracket without removing the bracket and the fixing screw. Therefore, it is possible to prevent the loss of the bracket and the fixing screw.

MODE FOR CARRYING OUT THE INVENTION

Figure 3:
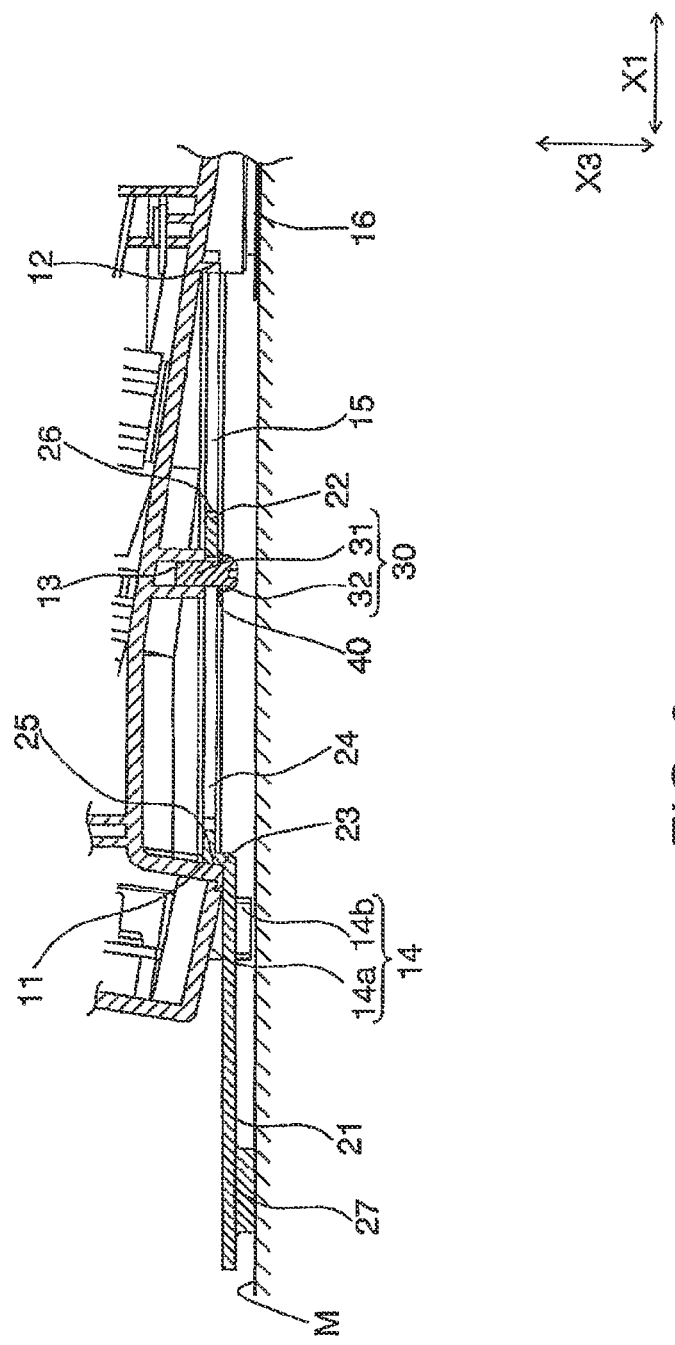
FIG. 3 is an explanatory diagram showing the bracket accommodation structure in the bracket pulled-out state.
Figure 5:
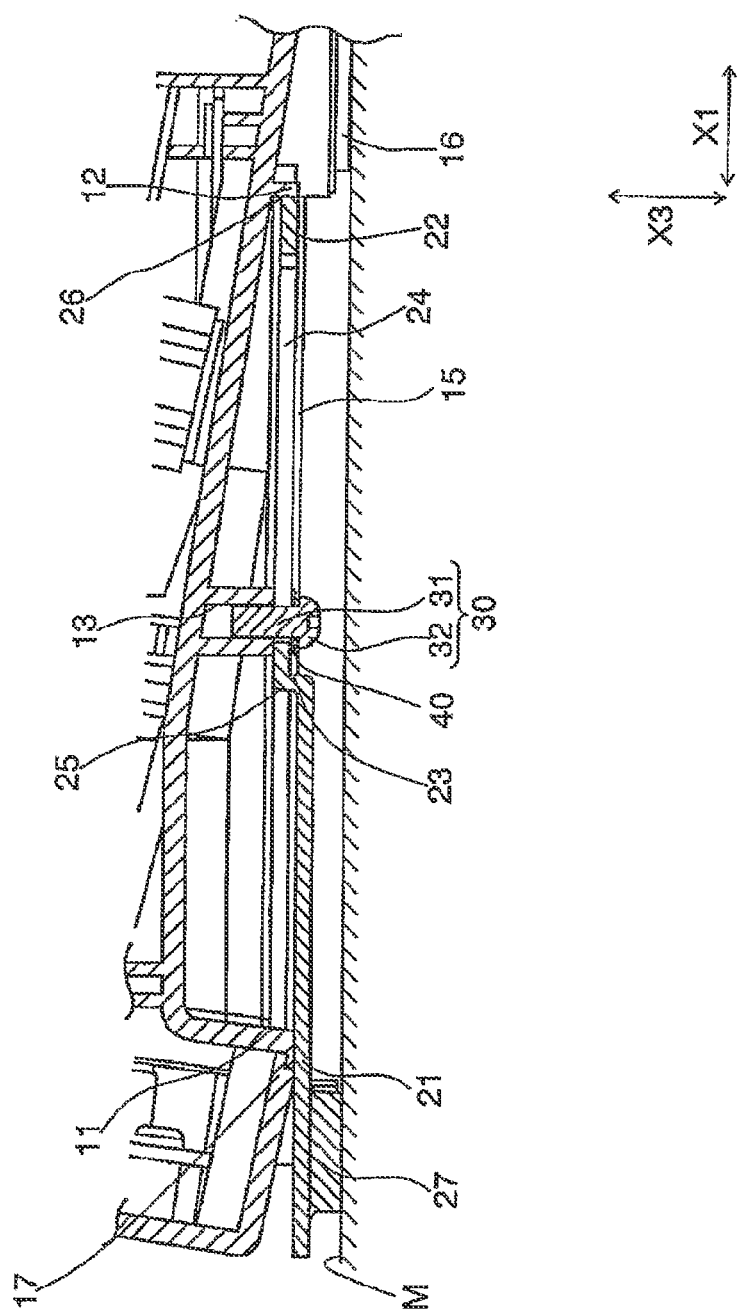
FIG. 5 is an explanatory diagram showing the bracket accommodation structure in the bracket accommodated state.
Figure 6:
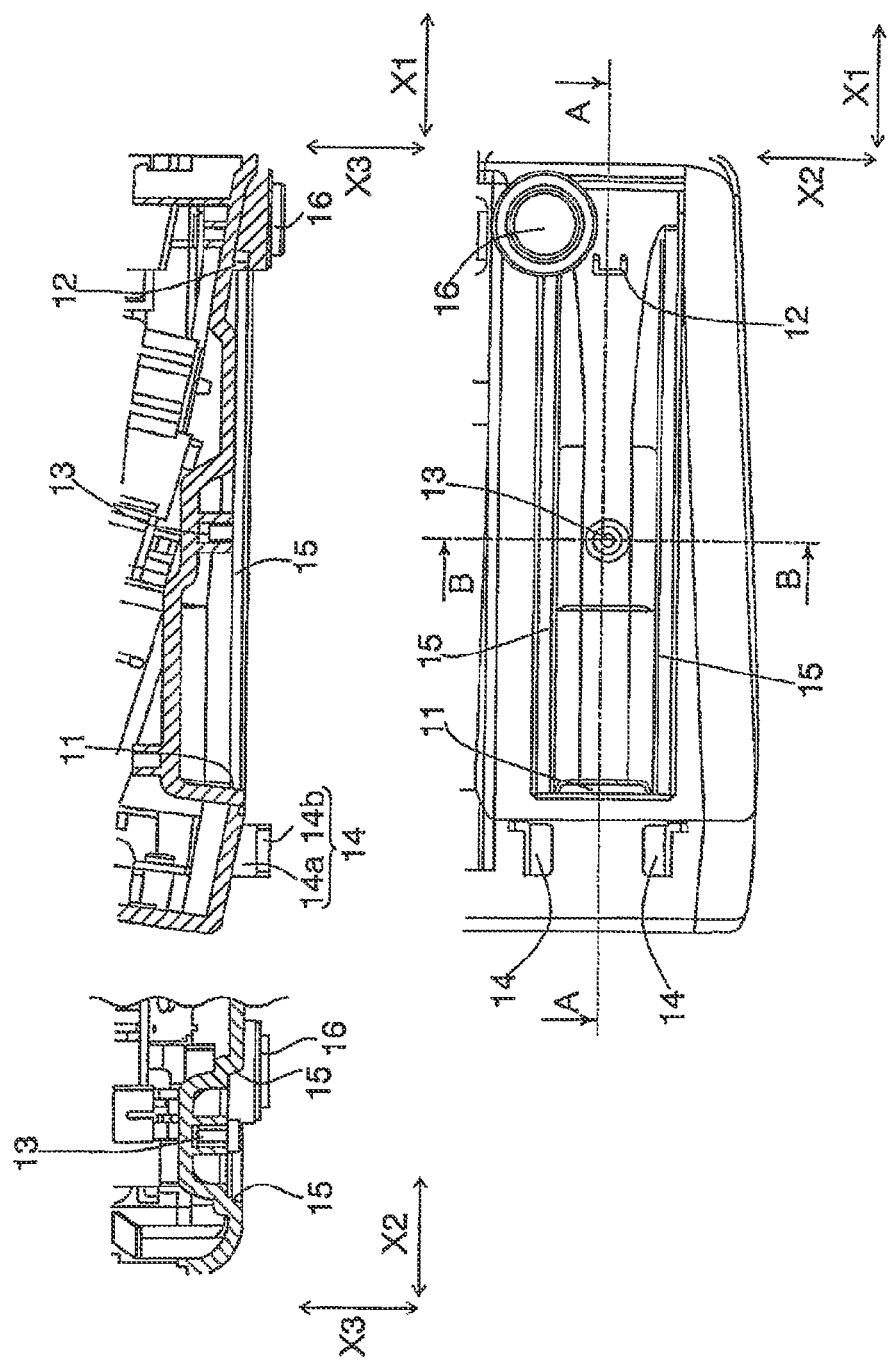
FIG. 6 is a plan view showing the bottom of the device in a state where the brackets and fixing screws are removed, is an explanatory diagram in cross section as seen in an arrow direction at a position of line A-A, and is an explanatory diagram in cross section as seen in an arrow direction at a position of line B-B.

Hereinbelow, a bracket accommodation structure according to an embodiment of this invention will be described with reference to the drawings. In FIGS. 3, 5, and 6, cross-sections are indicated by hatching.

Embodiment

Figure 2:
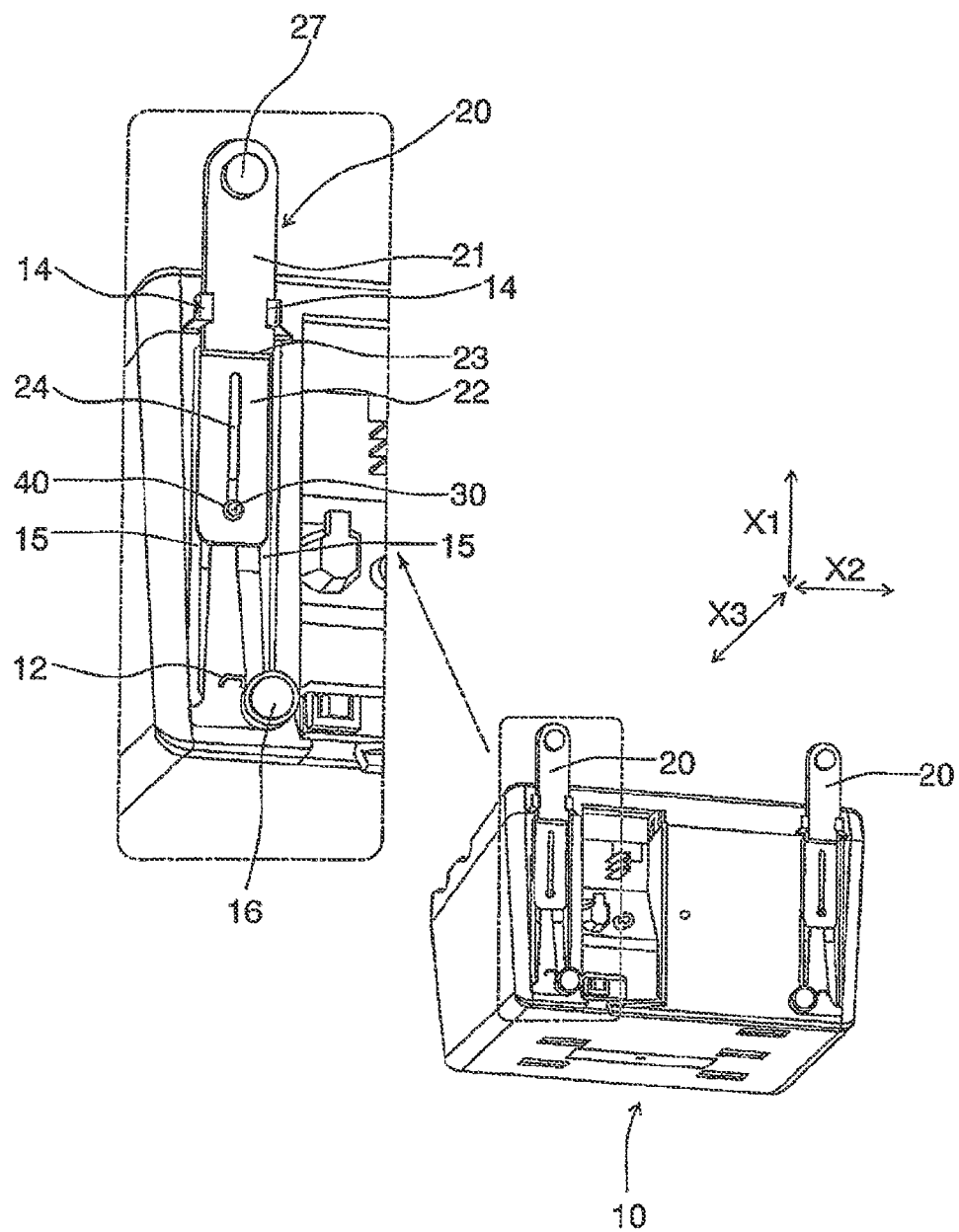
FIG. 2 is a perspective view showing, partly on an enlarged scale, the bottom side of a device in a bracket pulled-out state.

As shown in FIG. 2 and so on, the structure for accommodating brackets 20 in this embodiment comprises a device 10, the brackets 20 in a pair which are slidably attached to a bottom surface of the device 10, and a pair of fixing screws 30 for fixing the brackets 20 to the bottom surface of the device 10.

Figure 1A:
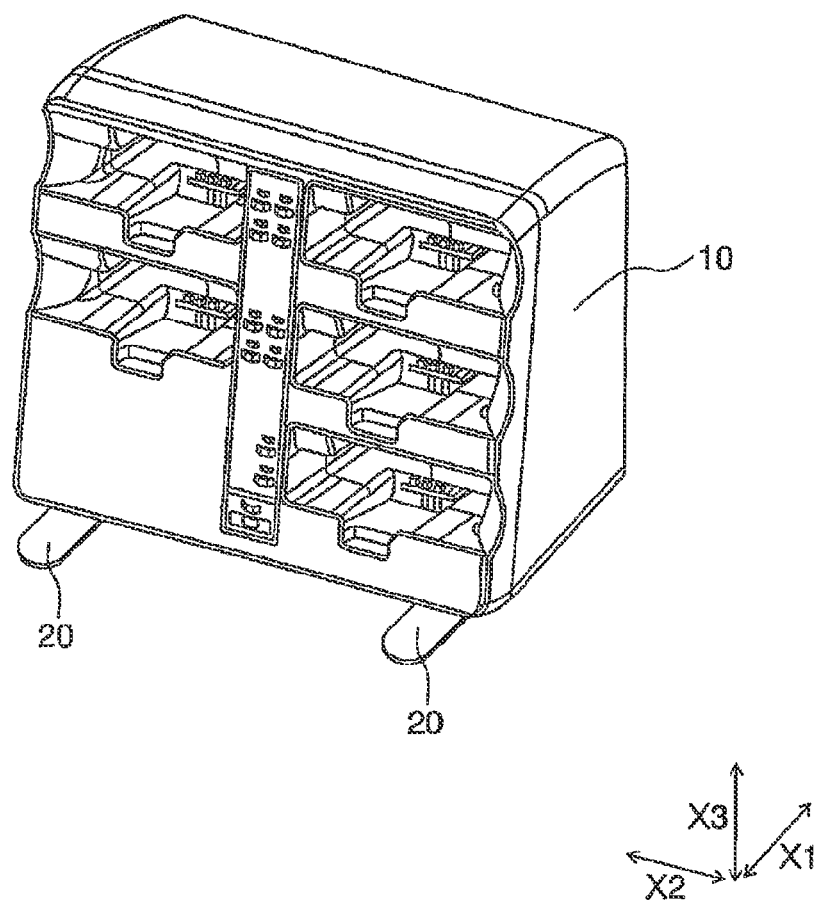
FIG. 1A is a perspective view showing a bracket accommodation structure according to an embodiment of this invention, wherein brackets have been pulled out.
Figure 1B:
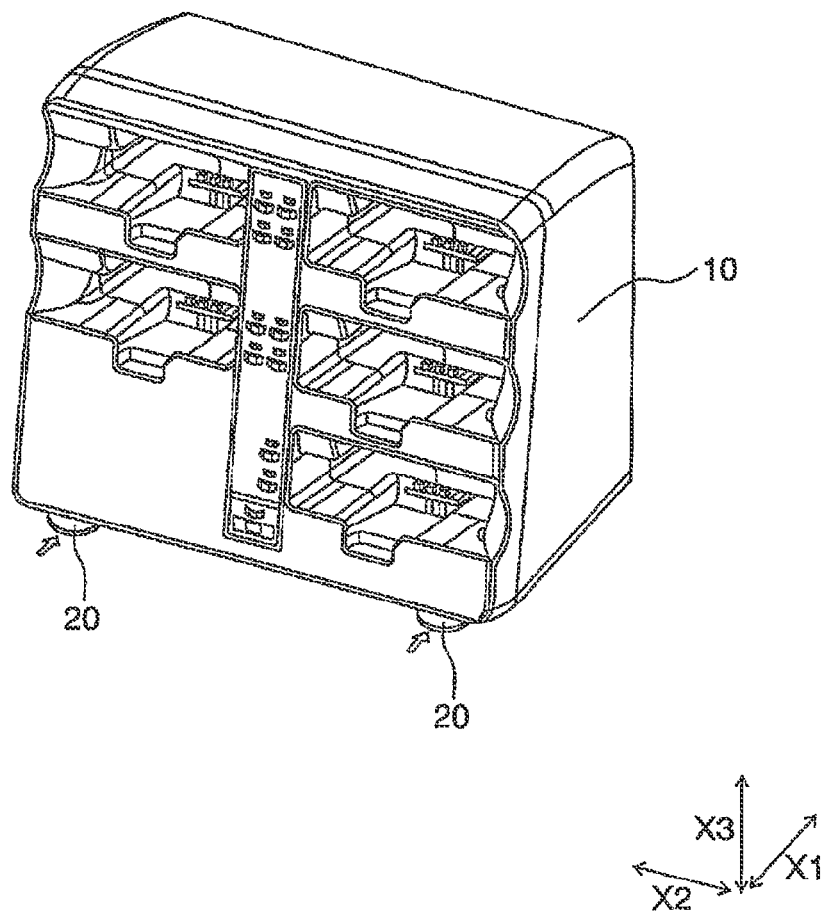
FIG. 1B is a perspective view showing the bracket accommodation structure according to the embodiment of this invention, wherein the brackets have been accommodated.

In this embodiment, as shown in FIG. 1, the device 10 is configured as a charging device for an electronic device. FIG. 1A is a diagram when the brackets have been pulled out while FIG. 1B is a diagram when the brackets have been accommodated. The device 10 may have any specific configuration.

As shown in FIGS. 2 to 6, the device 10 has, on its bottom surface side, a first stopper portion 11, a second stopper portion 12, a screw hole 13, a pair of claw portions 14, and a pair of guide portions 15 for each bracket, and a pair of device leg portions 16.

As shown in FIG. 3, in the state where the bracket 20 is pulled out of a projected plane of the device 10 to protrude to the outside, the first stopper portion 11 abuts against an end face, on a front side in a sliding direction X1, of a later-described stepped portion 23 of the bracket 20 to thereby restrict the movement of the bracket 20 to the front side in the sliding direction X1 in which the bracket 20 is slid. In this embodiment, an end face, on a back side in the sliding direction X1, of an angular portion formed on the bottom surface side of the device 10 serves as the first stopper portion 11. The first stopper portion 11 may have any specific configuration as long as it serves to restrict the movement of the bracket 20 to the front side in the sliding direction X1, and for example, it may be a projection formed to protrude downward from the bottom surface of the device 10.

As shown in FIG. 5, in the state where the bracket 20 is moved into the projected plane of the device 10 to be accommodated, the second stopper portion 12 abuts against an end face, on the back side in the sliding direction X1, of a later-described second portion 22 of the bracket 20 to thereby restrict the movement of the bracket 20 to the back side in the sliding direction X1. In this embodiment, the end face, on the front side in the sliding direction X1, of a projection formed to protrude downward from the bottom surface of the device 10 more on the back side in the sliding direction X1 than the first stopper portion 11 serves as the second stopper portion 12. The second stopper portion 12 may have any specific configuration as long as it serves to restrict the movement of the bracket 20 to the back side in the sliding direction X1.

As shown in FIGS. 3 and 5, the screw hole 13 is a hole into which the fixing screw 30 is screwed from the bottom surface side of the device 10. The screw hole 13 is formed between the first stopper portion 11 and the second stopper portion 12 in the sliding direction X1.

As shown in FIGS. 2 to 6, the claw portions 14 are each formed to protrude downward from the bottom surface of the device 10 more on the front side in the sliding direction X1 than the first stopper portion 11 and respectively hookingly engage with a first portion 21 of the bracket 20 from both sides in a width direction X2 of the bracket 20 which is perpendicular to the sliding direction X1. Each claw portion 14 is formed in a hook shape and has a first claw portion 14a formed to protrude downward from the bottom surface of the device 10 and a second claw portion 14b extending in the width direction X2 from a lower end of the first claw portion 14a. The claw portions 14 serve to guide the bracket 20 (first portion 21) in the sliding direction X1 when the bracket 20 is slid. Further, even in the case where the fixing screw 30 is removed from the screw hole 13, the claw portions 14 serve to hold the bracket 20 on the bottom surface side of the device 10. In this embodiment, the claw portions 14 (second claw portions 14b) are designed not to be in contact with a placement surface M in the state where the device 10 is placed on the placement surface M.

As shown in FIGS. 2 to 6, the guide portions 15 are each formed on the bottom surface of the device 10 along the sliding direction X1 in a region between the first stopper portion 11 and the second stopper portion 12 in the sliding direction X1. The pair of guide portions 15 are formed at positions spaced apart from each other in the width direction X2. The guide portions 15 serve to guide the bracket 20 (second portion 22) in the sliding direction X1 when the bracket 20 is slid. Further, the guide portions 15 serve to restrict the movement of the bracket 20 (second portion 22) in the width direction X2 during sliding and stopping of the bracket 20 so as to inhibit contact in the width direction X2 between the inner edge of a later-described slit portion 24 of the bracket 20 and a later-described shaft portion 31 of the fixing screw 30, thereby preventing a load from being applied to the fixing screw 30.

As shown in FIGS. 2 to 6, on the back side in the sliding direction X1, the device leg portions 16 are respectively formed on the bottom surface of the device 10 on both sides in the width direction X2. In this embodiment, it is configured such that, in the state where the device 10 is placed on the placement surface M, only the pair of device leg portions 16 and later-described bracket leg portions 27 of the pair of brackets 20 are brought into contact with the placement surface M. In this embodiment, the device leg portions 16 are provided in number of two. However, there is no limitation to the number of the device leg portions 16.

Figure 4:
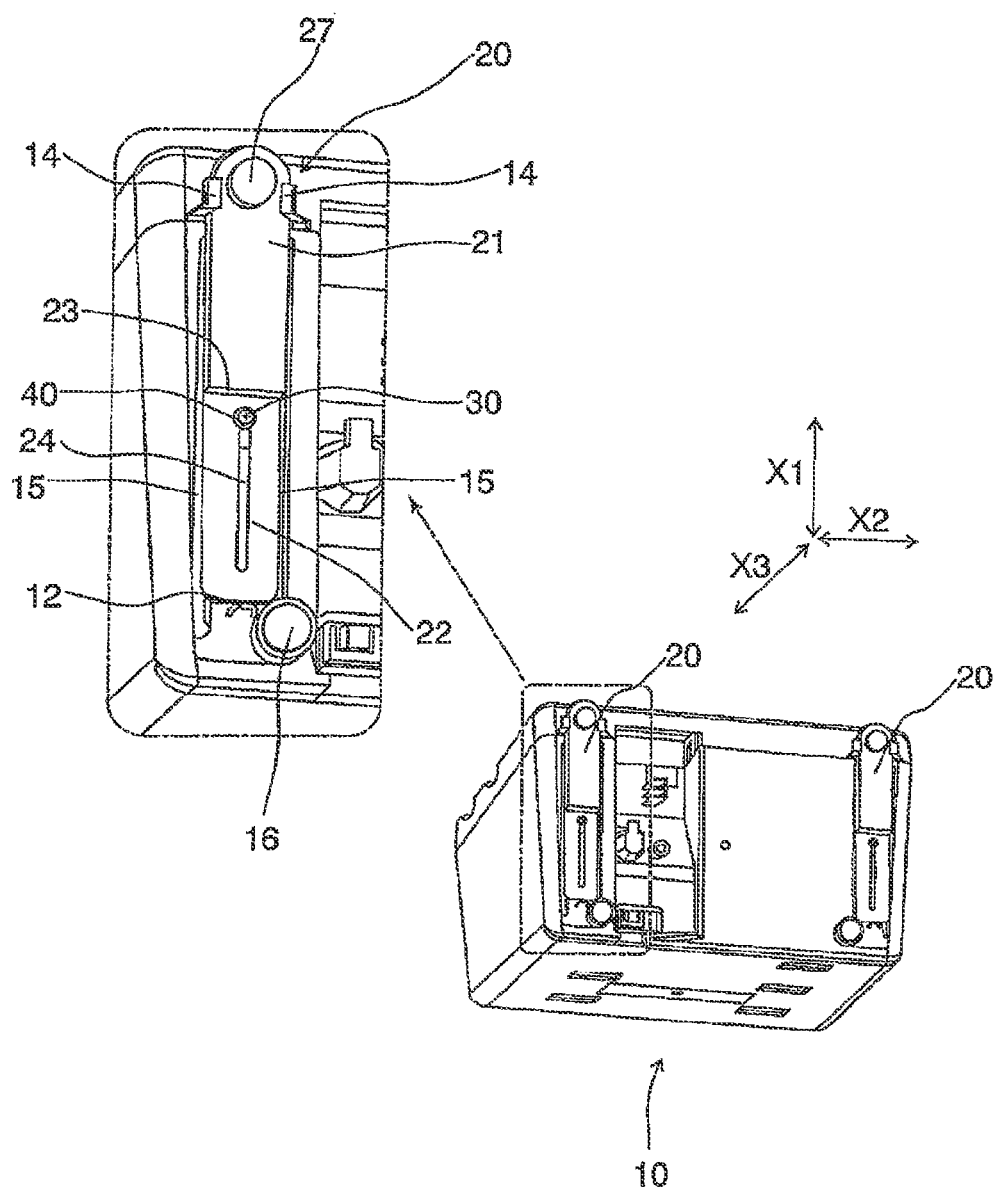
FIG. 4 is a perspective view showing, partly on an enlarged scale, the bottom side of the device in a bracket accommodated state.

The brackets 20 are respectively disposed on both sides in the width direction X2 of the bottom portion of the device 10. As shown in FIGS. 2 and 3, the brackets 20 are pulled out of the projected plane of the device 10 toward the front side of the device 10 to protrude to the outside, thereby preventing the device 10 from falling down. On the other hand, as shown in FIGS. 4 and 5, during non-use, at least most of each bracket 20 is accommodated in the projected plane of the device 10.

As shown in FIGS. 2 to 5 and 7, each bracket 20 has the first portion 21, the second portion 22, the stepped portion 23, the slit portion 24, a first to-be-restricted portion 25, a second to-be-restricted portion 26, and the bracket leg portion 27.

Figure 7:
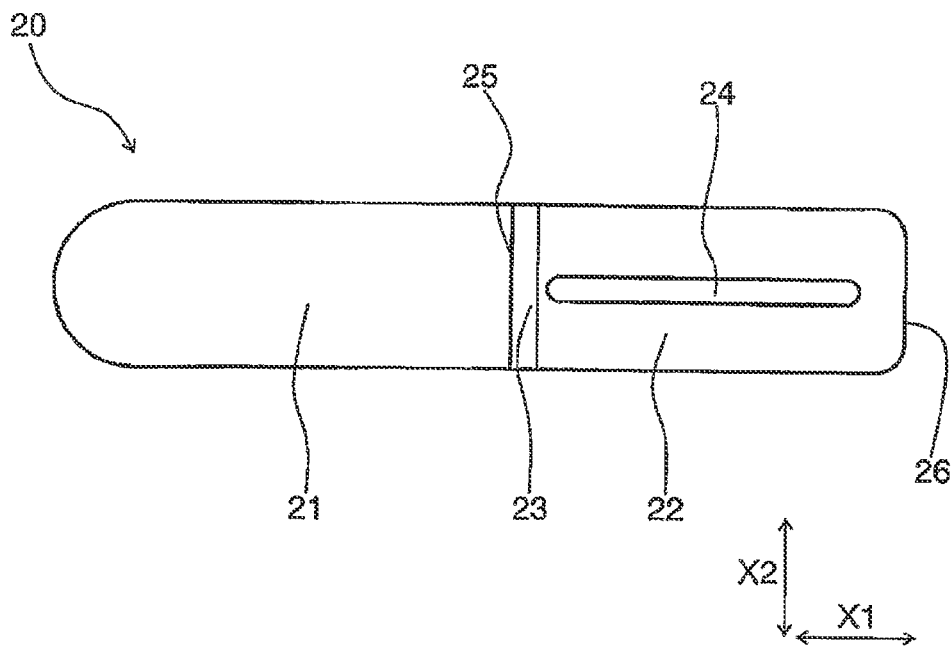
FIG. 7 is a top view and a side view showing the bracket.
Figure 7:
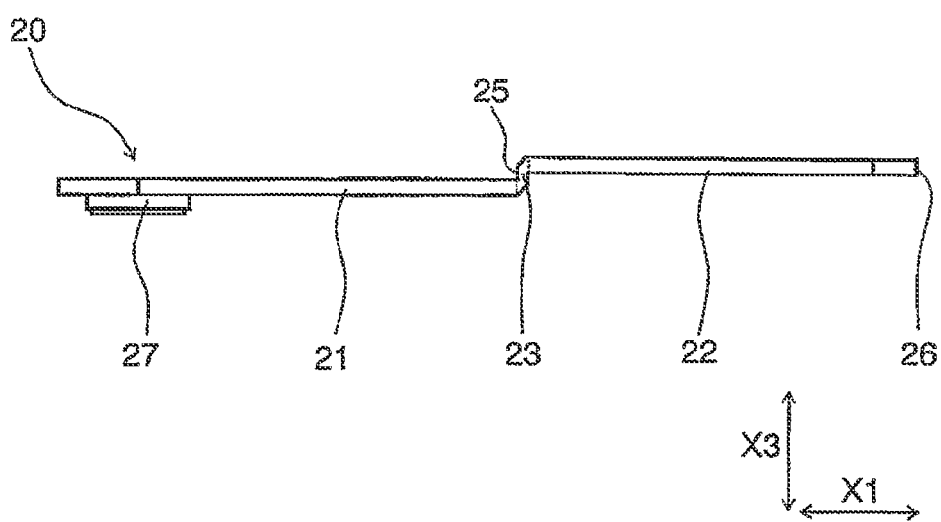

As shown in FIG. 7, the first portion 21 is formed in a flat shape and is disposed on the front side in the sliding direction X1 when the bracket 20 has been attached to the device 10. The second portion 22 is formed in a flat shape while being offset from the first portion 21 in a thickness direction X3 and is disposed on the back side in the sliding direction X1 when the bracket 20 has been attached to the device 10. In this embodiment, the first portion 21 and the second portion 22 are configured to be parallel to each other. The stepped portion 23 connects between the first portion 21 and the second portion 22 in a stepped manner. The first portion 21, the second portion 22, and the stepped portion 23 are formed by bending a flat plate member at the position of the stepped portion 23. This makes it possible to achieve the simple manufacture of the bracket 20. The first portion 21 and the second portion 22 may be joined together by welding or the like. In this embodiment, the first portion 21, the second portion 22, and the stepped portion 23 are formed of a metal, but may be made of any material such as a resin.

As shown in FIG. 7, the slit portion 24 is formed along the sliding direction X1 and passes through the bracket 20 in the thickness direction X3. The slit portion 24 is formed for the purpose of inserting the shaft portion 31 of the fixing screw 30 therethrough. In this embodiment, the slit portion 24 is formed as an elongated hole in the second portion 22. As shown in FIGS. 2 and 3, in the state where the first stopper portion 11 and the first to-be-restricted portion 25 abut against each other, the slit portion 24 extends to a position where a peripheral surface, on the back side in the sliding direction X1, of the shaft portion 31 of the fixing screw 30 is not brought into contact with the inner edge of the slit portion 24. Likewise, as shown in FIGS. 4 and 5, in the state where the second stopper portion 12 and the second to-be-restricted portion 26 abut against each other, the slit portion 24 extends to a position where the peripheral surface, on the front side in the sliding direction X1, of the shaft portion 31 of the fixing screw 30 is not brought into contact with the inner edge of the slit portion 24.

In this embodiment, as described above, the slit portion 24 is formed as the elongated hole. However, a specific configuration of the slit portion 24 is not limited thereto. The slit portion 24 may have any specific configuration as long as it is designed so that the length thereof is set longer along the sliding direction X1 than the distance of movement of the bracket 20 in the sliding direction X1 and that the peripheral surface, in the sliding direction X1, of the shaft portion 31 of the fixing screw 30 is not brought into contact with the bracket 20 in the case of either pulling-out or accommodation of the bracket 20. For example, the slit portion 24 may reach the end face, on the back side in the sliding direction X1, of the second portion 22 or the slit portion 24 may reach the first portion 21.

Further, the width of the slit portion 24 in the width direction X2 is designed so that, in the state where the movement of the bracket 20 in the width direction X2 is restricted by the guide portions 15, the peripheral surface, in the width direction X2, of the shaft portion 31 is not brought into contact with the inner edge of the slit portion 24.

As shown in FIG. 3 and so on, the first to-be-restricted portion 25 is restricted in movement to the front side in the sliding direction X1 by abutting against the first stopper portion 11. In this embodiment, the end face, on the front side in the sliding direction X1, of the stepped portion 23 serves as the first to-be-restricted portion 25. The first to-be-restricted portion 25 may have any specific configuration as long as its movement to the front side in the sliding direction X1 is restricted by a part of the bottom portion of the device 10, and for example, it may be a projection formed to protrude upward from an upper surface of the bracket 20 (side surface, facing the device 10, of the bracket 20).

As shown in FIG. 5 and so on, the second to-be-restricted portion 26 is restricted in movement to the back side in the sliding direction X1 by abutting against the second stopper portion 12. In this embodiment, the end face, on the back side in the sliding direction X1, of the second portion 22 serves as the second to-be-restricted portion 26. The second to-be-restricted portion 26 may have any specific configuration as long as its movement to the back side in the sliding direction X1 is restricted by a part of the bottom portion of the device 10. For example, it may be a projection formed to protrude upward from an upper surface of the bracket 20 (side surface, facing the device 10, of the bracket 20) or, like the first to-be-restricted portion 25, a stepped portion may be provided also on the back side in the sliding direction X1 of the bracket 20 and the end face, on the back side in the sliding direction X1, of the stepped portion may be used to serve as the second to-be-restricted portion 26.

As shown in FIG. 7 and so on, the bracket leg portion 27 is provided on the lower surface side of the first portion 21 and, in the state where the device 10 is placed on the placement surface M, the bracket leg portion 27 is brought into contact with the placement surface M. In this embodiment, the bracket leg portion 27 is formed of an elastic material such as a rubber. However, the material of the bracket leg portion 27 is not limited thereto and may be any material such as a resin or a metal. Further, the bracket leg portion 27 may be integrally formed of the same material as the first portion 21 and so on. The bracket leg portion 27 is formed substantially cylindrical in this embodiment, but may have another shape.

As shown in FIG. 4, the width of the bracket leg portion 27 in the width direction X2 (i.e. the diameter of the bracket leg portion 27 in this embodiment) is set smaller than the distance between the second claw portions 14b of the pair of claw portions 14. Consequently, when attaching the bracket 20 to the device 10, while the first portion 21 side formed with the bracket leg portion 27 is positioned at the head, the first portion 21 can be inserted between the pair of claw portions 14 toward the front side from the back side in the sliding direction X1. Further, as shown in FIG. 7, the end face, on the front side in the sliding direction X1, of the first portion 21 is rounded in a circular arc. This facilitates insertion of the first portion 21 between the pair of claw portions 14 when attaching the bracket 20 to the device 10.

As shown in FIGS. 4 and 5, when the bracket 20 has been accommodated, the bracket leg portion 27 is disposed on the lower side of and near a housing portion (portion indicated by symbol 17 in FIG. 5), on the front side in the sliding direction X1, of the device 10. Consequently, when the bracket 20 has been accommodated, the weight of the device 10 is applied directly to the bracket leg portion 27 and thus it is possible to prevent the elastic deformation of the bracket 20.

As shown in FIGS. 3 and 5, the fixing screw 30 has the shaft portion 31 having a threaded portion on its outer periphery and inserted through the slit portion 24 and a head portion 32 continuously formed at one end of the shaft portion 31 and disposed on the lower surface side of the bracket 20.

As shown in FIGS. 3 and 5, a washer 40 is interposed between the lower surface of the bracket 20 and the head portion 32 of the fixing screw 30. The size of the washer 40 is designed so that the washer 40 is brought into contact with the second portion 22 positioned on both outer sides in the width direction X2 of the slit portion 24 when accommodating or pulling out the bracket 20, further that, as shown in FIG. 3, the washer 40 is brought into contact with the second portion 22 positioned on the back side in the sliding direction X1 of the slit portion 24 when the bracket 20 has been pulled out, and further that, as shown in FIG. 5, the washer 40 is brought into contact with the second portion 22 positioned on the front side in the sliding direction X1 of the slit portion 24 when the bracket 20 has been accommodated. This makes it possible to ensure a large contact area between the bracket 20 and the washer 40.

In the bracket 20 accommodation structure of this embodiment thus obtained, since there is provided the stopper mechanism comprising the first stopper portion 11 and the second stopper portion 12 of the device 10 and the first to-be-restricted portion 25 and the second to-be-restricted portion 26 of the bracket 20, contact between the shaft portion 31 of the fixing screw 30 and the bracket 20 can be avoided in the case of either accommodation or pulling-out of the bracket 20. Therefore, it is possible to prevent a load from being applied directly to the fixing screw 30 and thus to prevent damage to the fixing screw 30.

Further, since at least most of the bracket 20 can be accommodated in the projected area of the device 10, it is possible to reduce a device placement space and thus to reduce particularly a device storage space when the device 10 is stored.

Further, it is possible to slide the bracket 20 by loosening the fixing screw 30 without removing the bracket 20 and the fixing screw 30. Therefore, it is possible to prevent the loss of the bracket 20 and the fixing screw 30.

Further, since the structure for attaching the bracket 20 to the device 10 is the simple structure using the fixing screw 30, the device structure can be prevented from becoming complicated.

In the above-mentioned embodiment, the brackets are attached to the bottom surface of the housing of the device for the purpose of preventing the device from falling down. However, the brackets may be attached to another surface (upper surface or side surface) of the device for another purpose.

In the above-mentioned embodiment, the two brackets are provided. However, there is no limitation to the number of the brackets.

In the above-mentioned embodiment, it is configured such that the brackets are pulled out toward the front side of the device. However, the direction in which the brackets are pulled out is not limited thereto. Further, it may alternatively be configured such that a plurality of brackets are pulled out in different directions.

This application claims priority based on Japanese Patent Application No. 2011-014275, filed on Jan. 26, 2011, the disclosure of which is incorporated herein in its entirety.

DESCRIPTION OF SYMBOLS 10 device
11 first stopper portion
12 second stopper portion
13 screw hole
14 claw portion
14a first claw portion
14b second claw portion
15 guide portion
16 device leg portion
20 bracket
21 first portion
22 second portion
23 stepped portion
24 slit portion
25 first to-be-restricted portion
26 second to-be-restricted portion
27 bracket leg portion
30 fixing screw
31 shaft portion
32 head portion
40 washer
X1 sliding direction
X2 width direction
X3 thickness direction
M device placement surface

The invention claimed is:

1. A bracket accommodation structure comprising:
a device,
a bracket slidably provided on a bottom surface of the device and slidable from a front side and a back side of the device along a sliding direction, and
a fixing screw for fixing the bracket to the device, wherein:
the device has, on the bottom surface of a housing, a first stopper portion configured to restrict movement of the bracket to the front side in the sliding direction, a second stopper portion formed more toward the back side in the sliding direction than the first stopper portion and configured to restrict movement of the bracket to the back side in the sliding direction, and a screw hole into which the fixing screw is screwed, and
the bracket has a first portion of a flat shape and a second portion of a flat shape which is connected to the first portion through a stepped portion, the second portion parallel to the first portion, and which is extending in the sliding direction, a first to-be-restricted portion formed by the stepped portion and configured to abut against the first stopper portion so as to be restricted in movement to the front side in the sliding direction, a second to-be-restricted portion formed at an end of the second portion and configured to abut against the second stopper portion so as to be restricted in movement to the back side in the sliding direction, and a slit portion which is formed on the second portion along the sliding direction and through which a shaft portion of the fixing screw is inserted.

2. The bracket accommodation structure according to claim 1, wherein:
when the first stopper portion and the first to-be-restricted portion abut against each other, the slit portion extends to a position where a peripheral surface, on the back side in the sliding direction of the shaft portion of the fixing screw, is not brought into contact with the bracket; and
when the second stopper portion and the second to-be-restricted portion abut against each other, the slit portion extends to a position where the peripheral surface, on the front side in the sliding direction of the shaft portion of the fixing screw, is not brought into contact with the bracket.

3. The bracket accommodation structure according to claim 1, wherein the slit portion is formed as an elongated hole.

4. The bracket accommodation structure according to claim 1, wherein the device further has a pair of hook-shaped claw portions which are formed to protrude from the surface of the housing of the device and respectively hookingly engage with the bracket from both sides in a width direction of the bracket, the width direction being perpendicular to the sliding direction.

5. The bracket accommodation structure according to claim 1, further comprising a pair of guide portions in a region between the first stopper portion and the second stopper portion in the sliding direction, the guide portions each formed along the sliding direction and spaced apart from each other.

6. The bracket accommodation structure according to claim 5, wherein a width of the slit portion in a width direction of the bracket which is perpendicular to the sliding direction is set so that, in a state where the bracket is guided by the guide portions, a peripheral surface, in the width direction, of the shaft portion of the fixing screw is not brought into contact with an inner edge of the slit portion.

* * * * *